Sept. 23, 1941.  E. W. PEARSON ET AL  2,256,961
REFRIGERATOR CAR INSULATION AND METHOD OF APPLYING IT
Filed Jan. 24, 1940  2 Sheets-Sheet 1
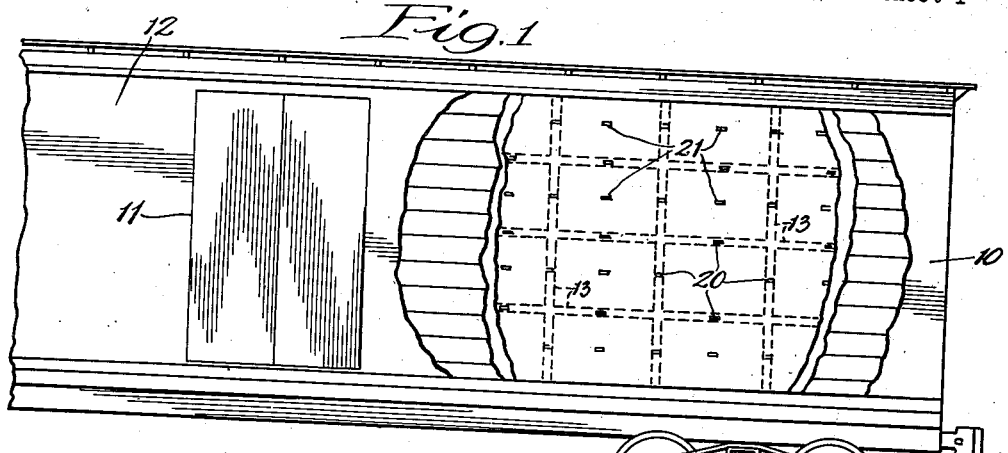
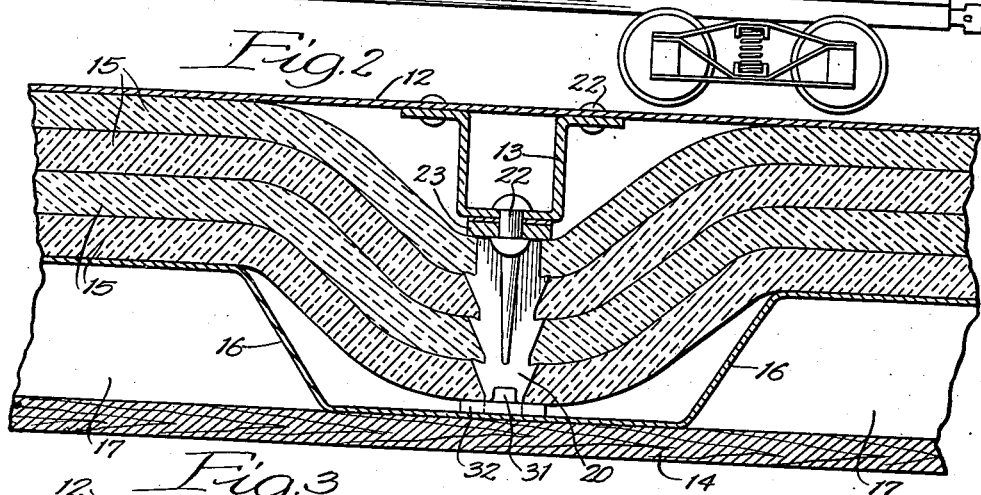
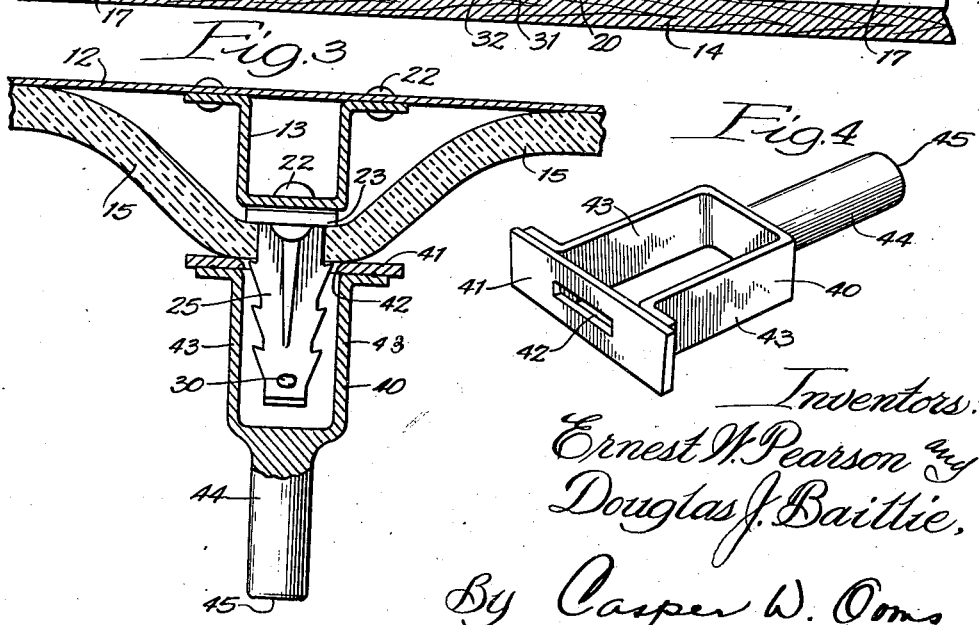
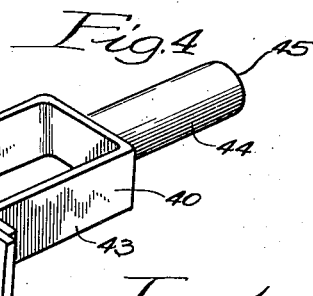
Inventors:
Ernest W. Pearson and
Douglas J. Baillie,
By Casper W. Ooms
Attorney.

Sept. 23, 1941.  E. W. PEARSON ET AL  2,256,961
REFRIGERATOR CAR INSULATION AND METHOD OF APPLYING IT
Filed Jan. 24, 1940  2 Sheets-Sheet 2
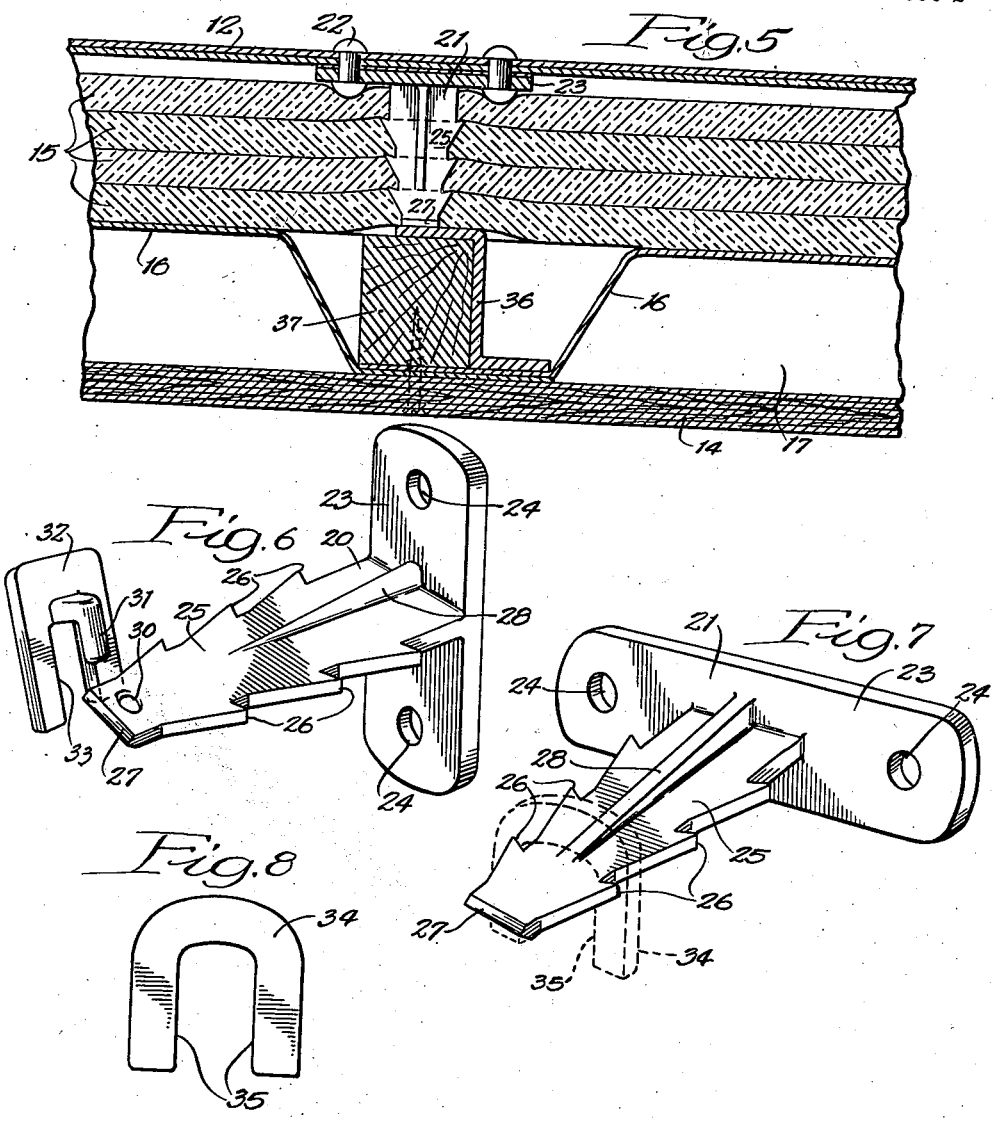

Patented Sept. 23, 1941

2,256,961

UNITED STATES PATENT OFFICE 2,256,961

REFRIGERATOR CAR INSULATION AND METHOD OF APPLYING IT

Ernest W. Pearson and Douglas J. Baillie, Montreal, Quebec, Canada

Application January 24, 1940, Serial No. 315,358

17 Claims. (Cl. 20—4)

This invention relates in general to a new and improved refrigerator car insulation and the method of applying and supporting the insulation.

Refrigerator car walls are now commonly composed of an outer wood or steel sheathing supported by framing posts and braces of steel or wood, a lining of metal but more usually wood sheathing spaced from the outer sheathing, and an intermediate filler of insulation applied in the form of sheets or blankets of fibrous insulating material. As the car is subject to all sorts of train shocks which tend to shake the insulation down if it is not held securely and properly in place, the insulation must be permanently fastened to the walls. In fastening this insulation to the walls, it has been necessary to batten the blankets down with vertical squeeze strips and belt rails, which compress a substantial area of the insulation in a car. This compression of the insulation materially reduces its efficiency as an insulator at the areas of compression.

It is therefore an important object of this invention to provide improved means for supporting the insulation with a minimum of compression, and to simplify the application of blanket forms of insulation to a car.

Another object of the invention is to eliminate the heavy wood belt rails and squeeze strips formerly required and thus to reduce the weight of the car.

A further object of the invention is to provide means to suport and maintain successive sheets of insulation in place while other sheets are being added, and also to support the insulation securely and permanently after installation to prevent shifting or shaking down of the insulation under all conditions of service.

A further object of the invention is to provide a new and improved method of applying insulation to the walls of a refrigerator car in accordance with this invention.

Other and further objects of the invention will appear hereinafter, the accompanying drawings illustrating a preferred embodiment of the invention, in which Fig. 1 is a side elevation of a portion of a railroad car with a section thereof broken away to illustrate the interior of the car with the insulation applied;

Fig. 2 is a sectional view of the wall of a refrigerator car as shown in Fig. 1 showing one of the insulation supports with the insulation applied thereto;

Fig. 3 is a sectional view showing the means and method of applying insulation blankets to the insulation supports;

Fig. 4 is a perspective of one of the tools used for applying the insulation;

Fig. 5 is a sectional view similar to Fig. 2 with a different form of insulation support mounted betwen one of the structural members of the car and the outer side wall of the car;

Fig. 6 is a perspective of one form of insulation support with an insulation keeper therefor;

Fig. 7 is a perspective of another form of insulation holder which has no keeper at its free end; and Fig. 8 shows an insulation support key which may be used for engaging successive sheets of insulation as they are applied to the holding bars, and may also be used as a key to lock the insulation upon one of the insulation supports.

Blanket insulation is commonly applied to refrigerator car walls in a continuous blanket from the door post on one side, along the side, around the car end and the opposed side to the corresponding door post on the opposed side. The blankets or sheets are approximately eight feet wide by forty feet long and contained in rolls which are bulky and heavy to handle and cumbersome to apply. Each layer must be secured in place at frequent intervals to hold it in proper position. After the required number of layers are superposed, they have heretofore been compressed together and permanently secured by squeeze strips and belt rails attached to the car framing. This method of application is tedious and difficult, the layers are liable to slip, sag, and become displaced, and compression of substantial areas of the insulation at close intervals correspondingly reduces its efficiency as an insulator.

These objections are overcome in the present invention by the provision of a plurality of fixed insulation supports projecting from the inside wall of a car, or other wall to which insulation is to be applied. The insulation is applied to these supports by forcing the blanket or sheet insulation over the ends of the respective supports, which permanently hold each sheet in fixed position without compression of the insulation.

Referring now more particularly to the drawings, a portion of a refrigerator car 10 is shown in Fig. 1 having one wall thereof broken away to indicate the application of insulation to the opposed wall in a continuous sheet extending from a door opening 11 at one side of the car around the end of the car and to the corresponding door opening at the other side of the car. The walls of refrigerator cars generally are composed, as shown in Fig. 2, of an outer wood or steel sheathing 12 with upright framing posts 13, an inside lining 14 of wood sheathing or other suitable material, and interposed blankets 15 of insulation. The car may also be provided with an inside sheet metal shell or wall 16 located inside of the lining 14 and bent or fluted to provide vertical air spaces or convection ducts 17, although this construction forms no part of the present invention.

The present invention relates particularly to the attachment and support of the insulating sheets or blankets. These are preferably made of a loose fibrous mass felted or quilted together to provide a continuous flexible sheet which provides a satisfactory insulation between the inner and outer walls for thermal insulating purposes. The blankets are frequently applied in multiple layers, the number varying according to the thickness of the individual layers and the amount of insulation required.

As each blanket or sheet of insulation is separately applied, considerable difficulty has been experienced heretofore in holding one sheet in position without unduly compressing it at intervals while the next and adjacent sheets are being applied, and then in securing all of the sheets permanently in place. In this invention a plurality of barbed supports 20 or 21 are permanently attached to framing posts 13 or directly to the outer walls 12 of a car by bolts 22 or other suitable fastening means.

Each support has an attachment base 23 with perforations 24 through which the fastening bolts extend, and perpendicular thereto a projecting substantially flat spear 25 with reversely turned points or barbs 26 along both edges and an outer sharpened or pointed extremity 27. Reinforcing each spear a strengthening rib 28 is shown as cast integral therewith, and running from the base 23 along a substantial length of the spear.

At the outer end of one form of the spear shown in Fig. 6 is a hole 30 to receive the tongue or projection 31 of the insulation keeper 32 which has a slot or recess 33 below the tongue adapted to be seated over the pointed end 27 of the post or spear 25. This keeper 32 serves to form an abutment for the end of the spear, protecting the pointed edge thereof, to hold the layers of insulation on the spear post, and as a spacer between the spear point 27 and the sheathing 14.

Another form of support 21 is shown in Fig. 7, and installed in a car wall in Fig. 5. This form is particularly suitable where the free end of the support is to bear directly against permanent structural units inside the car as shown in Fig. 5.

If a less number of insulation blankets than is provided for by the number of barbs upon the support is used, a key 34, shown in Fig. 8, can be used to lock the blanket in position upon the support.

This key is preferably U-shaped in form and the space in a recess 35 between the legs is sufficient to permit engagement of the key with one or more of the shoulders formed by the opposed bar points 26.

The key 34 may also be used for engaging the insulation sheets temporarily while successive insulation blankets are applied to the supports. After one blanket is applied to the supports 21 the keys 34 may be loosely applied to the insulation supports, and as the next blanket is applied thereto, the keys 34 may be successively removed for the free application of the insulation to the supports. The key 34 may be used with the supports 20 in the same manner.

In the application of insulation to a refrigerator car the supports 20 and 21 may be spaced apart or alternated in vertical rows. The supports may be mounted upon framing posts 13 secured to the outer wall of the car, as shown in Fig. 2, thereby forming a wave or bulge in the insulation applied thereto, others may be secured directly to the outer wall of the car, and others as shown in Fig. 5, between the car wall and structural members such as the post, constructed of an angle bar 36 and a wood bar 37 secured thereto, abutting the end 27 of the support 21. The engagement of this bar with the insulation causes no substantial wave or deflection thereof as the framing post is at the inside of the insulation rather than at the outside and the insulation is held in place on the supports in either case without danger of disengagement therefrom.

In applying sheet insulation of this kind to the barbs, it is impractical and destructive of insulating efficiency to provide spaced perforations in the blankets for receiving the supports. The insulation is therefore forced over the pointed extremities of the supports and over the successive barbs 26 thereof, depending upon the number of layers of the insulation. When the insulation is light or thin this may be done by hand or by pounding with a mallet which forces the sharpened end 27 of the support through the insulation. A tool 40, as shown by Figs. 3 and 4, may also be employed. This tool comprises a plate 41 with a slot 42 therein slightly larger in its dimensions than the greatest width of the support spear. Attached to the ends of this plate are forked extremities 43 of a yoke upon which there is also a handle 44. The end 45 of the handle is adapted to be struck by a hammer or mallet so that when a sheet of insulation is applied over a support, the application of the tool opposite the point thereof, and forcing the tool inwardly, will cause the insulation to be slit and forced over the supports as shown in Fig. 3. The fibrous nature of the material causes it to engage behind the successive points 26 of each of the barbs upon the support, thus assuring retention of the insulation upon the supports. In practice this tool is rapidly applied in succession to each of the barbed supports as the insulation is applied thereto. As the successive barbs 26 at each side of the support are graduated in their distance from the middle, each successive layer or sheet of insulation will be separately held and supported by the barbs and supports without compression and without danger of displacement.

After all of the layers of insulation are applied over the supports 20 and 21 the inner framing posts 36, 37 may be placed against the inner ends of the supports 21, the insulation keepers 32 may be hooked into the ends of the supports 20 and the metal lining and flue sheets 16 may be placed over the insides of the posts 36, 37 and against the keepers 32, and the inside sheathing 14 may be fastened in place by securing it to the posts 37.

Having thus described our invention, what we claim as new and desire to secure by Letters Patent of the United States is:

1. In a wall insulation, a plurality of horizontal supports, said supports bearing a plurality of spaced barbs along the edges thereof and being pointed at the ends, a plurality of flexible insulating sheets suspended upon said supports and retained thereon in spaced relation to each other by said barbs.

2. A wall insulation comprising a plurality of horizontal supports affixed to the wall, each support having a point and broken edges, and a blanket insulation applied over the supports and suspended thereupon and engaged by the edges thereof to prevent removal therefrom.

3. A refrigerator wall insulation comprising an outer wall, a plurality of pointed supports affixed to the wall, a plurality of insulating sheets impaled upon and suspended by the pointed supports, an inner wall and supporting posts therefor, the posts engaging the outer ends of the pointed supports to retain the sheet insulation in place upon the supports between the said inner and outer walls.

4. A wall insulation comprising a plurality of flexible insulating sheets and a plurality of barbed supports therefor, each support comprising a base with a flat spear projecting therefrom having a pointed extremity to perforate the sheets as applied thereto, and the edges of the spear having opposed graduating barbs for engaging successive sheets of insulation and holding them thereon in spaced relation without compression and against removal therefrom.

5. A structure in accordance with claim 4 in which the barbed supports are provided with a keeper for engaging the outer end of each support to confine the sheets applied thereto in place upon the support and to prevent removal therefrom.

6. In the wall insulation, a plurality of flexible insulating sheets and a plurality of fixed supports therefor, each support comprising an attaching base, a substantially flat spear projecting therefrom, the spear having opposed barbs along the edges thereof and a sharpened extremity with a perforation adjacent the extremity, and a keeper for the outer end of the spear comprising a plate with a recess to embrace the outer sharpened end of the spear and a tongue extending therefrom to engage the perforation.

7. The method of wall insulation which comprises applying flexible sheet insulation to a wall by impaling successive portions of the sheet upon barbs projecting from the wall until the entire wall is covered, and in suspending said portions of the sheet in position upon said supports while the entire sheet and other sheets are similarly applied.

8. The method of insulating a wall which comprises successively impaling separate sheets of flexible fibrous insulation upon the same barbed supports until the desired thickness is obtained, in applying each sheet separately to the several supports in a step by step manner until the whole sheet is supported, and in spacing the separate sheets apart by their engagement with the barbs upon the supports so that they are held sagless without compression.

9. The method of insulating a wall which comprises impaling successive portions from a roll of flexible fibrous insulation upon barbed supports projecting from the wall until a whole sheet is applied, in pressing the sheet to engage the widest ends of the supports, in applying successive sheets until the desired thickness is obtained, in spacing the separate sheets apart and preventing their disconnection during application by their engagement with the successive barbs of the supports to support each sheet in place against sagging and without compression, and in applying an inner cover and holder to the ends of the support to prevent disengagement of the sheets.

10. The method of insulating a wall having inner and outer linings which comprises impaling successive sheets of insulating material upon barbed supports projecting from one lining, spacing the sheets upon the supports by engagement of the barbs thereof to avoid compression of the sheets, and providing an abutment extending from the other lining to the outer end of the supports with the sheets supported against removal by the supports.

11. The method of applying insulation to a wall having fixed barbed supports projecting therefrom which comprises impaling successive portions from a roll of flexible sheet insulation upon the supports until the entire sheet is applied, holding the applied sheet and portions thereof in place against removal while other portions and other sheets are applied, forcing each sheet into engagement with the uncovered barb points nearest the wall, spacing the sheets apart and free from compression on said supports, and holding all the sheets in place for the application of a cover lining therefor.

12. A heat insulating wall comprising an outer wall sheathing, a plurality of supports attached to the inside of the outer wall and extending inwardly therefrom and having sharpened barbs, a plurality of flexible sheets applied over and perforated by the supports and held by the barbs in spaced relation without compression and against removal from said supports, and an inner lining engaging the inner ends of the supports.

13. In a wall insulation, a support comprising a base for connection with a wall and a flat spear body extending from the base and formed with a plurality of longitudinally spaced barbs adapted separately to support a plurality of layers of insulating sheets.

14. In a wall insulation, a support comprising a base for connection with a wall and a flat spear body extending from the base, said body being outwardly tapered and formed at its edges with longitudinally spaced pairs of barbs separately to support a plurality of layers of insulating sheets.

15. In a wall insulation, a support comprising a base for connection with a wall and a flat spear body extending from the base and formed with a plurality of longitudinally spaced barbs adapted separately to support a plurality of layers of insulating sheets, and a keeper formed with a slot therein to fit over the body and to engage the barbs to hold a sheet on the body.

16. In a wall insulation, a support comprising a base for connection with a wall and a flat spear body extending from the base and formed with a plurality of longitudinally spaced barbs adapted separately to support a plurality of layers of insulating sheets, said body being formed with an opening adjacent its outer end, and a keeper including a plate formed with a recess to receive the outer edge of the body and with a tongue extending therefrom to fit through said opening.

17. In a wall insulation, a support comprising a base for connection with a wall and a flat spear body extending from the base and formed with a plurality of longitudinally spaced barbs adapted separately to support a plurality of layers of insulating sheets in combination with a plate formed with a slot to receive said body and a yoke connected to the ends of said plate, said plate being adapted to be forced over the body to force an insulating sheet onto it.

DOUGLAS J. BAILLIE.
ERNEST W. PEARSON.